US008116251B2

(12) United States Patent
Hattori (10) Patent No.: US 8,116,251 B2
(45) Date of Patent: Feb. 14, 2012

(54) MOBILE PHONE, COMMUNICATION TERMINAL, PHONE CALL METHOD AND PHONE CALL PROGRAM

(75) Inventor: Tadayuki Hattori, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1583 days.

(21) Appl. No.: 11/461,252

(22) Filed: Jul. 31, 2006

(65) Prior Publication Data

US 2007/0041371 A1  Feb. 22, 2007

(30) Foreign Application Priority Data

Aug. 22, 2005  (JP) .................................. 2005-240079

(51) Int. Cl.
*H04W 4/00* (2009.01)
(52) U.S. Cl. ......................... 370/313; 370/465; 370/466
(58) Field of Classification Search .......................... None
See application file for complete search history.

(56) References Cited

U.S. PATENT DOCUMENTS

| 2006/0128376 A1* | 6/2006 | Alexis ........................ 455/426.1 |
| 2006/0187900 A1* | 8/2006 | Akbar ............................ 370/352 |
| 2006/0253894 A1* | 11/2006 | Bookman et al. ................. 726/2 |
| 2006/0291483 A1* | 12/2006 | Sela .............................. 370/401 |
| 2008/0132279 A1* | 6/2008 | Blumenthal .................. 455/558 |

FOREIGN PATENT DOCUMENTS

| EP | 1 494 439 A2 | 1/2005 |
| GB | 2 406 925 A | 4/2005 |
| JP | 2003-110667 | 4/2003 |

* cited by examiner

*Primary Examiner* — Donald Mills
(74) *Attorney, Agent, or Firm* — Oblon, Spivak, McClelland, Maier & Neustadt, L.L.P.

(57) ABSTRACT

A mobile phone connected to a telephone network which uses a telecommunication line by way of a communication terminal including: a wireless communication unit; a sound input unit and a sound output unit; a transmission interface unit; a user information memory unit; a memory unit; a detection unit; and control unit transferring user information stored in the user information memory unit and the phone call program stored in the memory unit to the communication terminal through the transmission medium respectively and also changing over a sound data output destination of the sound input unit and a sound data input source of the sound output unit from the communication unit to the transmission interface unit respectively in a case when it is detected by the detection unit that the own apparatus and the communication terminal are connected mutually.

12 Claims, 8 Drawing Sheets

MOBILE PHONE, COMMUNICATION TERMINAL, PHONE CALL METHOD AND PHONE CALL PROGRAM

CROSS REFERENCES TO RELATED APPLICATIONS

The present invention contains subject matter related to Japanese Patent Application JP 2005-240079 filed in the Japanese Patent Office on Aug. 22, 2005, the entire contents of which being incorporated herein by reference.

BACKGROUND OF THE INVENTION

1. Field of the Invention

The present invention relates to a technology utilizing a telephone service by connecting a mobile phone to a communication terminal which is connected to a telecommunication line such as internet or the like and more particularly relates to a phone call method and a phone call program realizing it which utilize a telephone service by using a mobile phone in which a mobile phone utilizable as a sound input and output unit (microphone and speaker) and a communication terminal to which the mobile phone is connected are used and the mobile phone and the communication terminal are connected.

2. Description of the Related Art

In the past, an internet phone and a video phone using, for example, SIP (Session Initiation Protocol) existing in RFC (Request For Comment) 3261 as a protocol of a call control message became popular for the reasons of cheapness in calling rate, broad band establishment of internet and the like.

In a VoIP (Voice over Internet Protocol) system realizing this internet phone, in a communication system used by a user, usually, an exclusive software is installed at the communication terminal and an exclusive software is customized in accordance with the apparatus constitution by connecting a microphone and speaker system and (according to the situation) an imaging camera. As the communication terminal, an audio component, a game terminal unit, a set-top box connected to a home television receiver or the like which has a function of downloading contents from a personal computer (PC) or an internet is utilizable.

In recent years, it has become possible for a mobile phone to be equipped with a high-resolution CCD (Charge Coupled Devices), a CMOS (Complementary Metal Oxide Semiconductor) camera, a stereo speaker or a microphone, wherein the internet is progressing in high band establishment as compared with a mobile phone communication network used in the mobile phone, so that it is possible to transmit and receive a moving picture of high picture quality and a sound of high sound quality in real time bidirectionally.

Also, in the VoIP system, generally, an internet phone terminal (own station) on the outgoing side notifies information such as an IP telephone number, SIP URI (URI: Uniform Resource Identifier), UID (user discriminating information) or the like of a phone call partner to a relay server and an IP (Internet Protocol) address of an internet phone terminal on the incoming side (partner station) is obtained. Then, a packet communication is carried out with the partner station by way of the IP network by using this IP address and sound and moving picture information is transmitted (for example, see Patent Document 1).

For this purpose, a management server is included in the VoIP system network and the management server stores an IP address of a user and a MAC (Media Access Control) address of an IP network interface in relationship to an IP telephone number and an SIP URI or UID (user discriminating information) of the aforesaid user. Then, the relay server notifies the IP telephone number on the incoming side to the management server on an occasion of an internet phone connection request from the outgoing side and obtains the IP address and the MAC address on the incoming side. Consequently, the user registers own UID, IP address, MAC address and IP telephone number to the management server beforehand when utilizing the internet phone. Also, a substitutional phone number (fixed phone number, mobile phone number or the like) is to be registered for the incoming in a situation in which the internet phone cannot not utilizable.

[Patent Document 1] Japanese Unexamined Patent Publication No. 2003-110667

SUMMARY OF THE INVENTION

And now, in the VoIP system in the past mentioned above, it is necessary to be equipped with a microphone, a speaker and an imaging camera exclusive for the communication terminal (in a communication terminal such as a personal computer or the like, a speaker is often included, but it often happens that a microphone or an imaging camera is not included). Also, an exclusive software should be installed in a communication terminal and further should be customized for every user and an initialization procedure thereof is complicated, so that there is a problem that a user cannot utilize it readily. In other words, it is necessary to prepare a microphone, speaker, camera and exclusive software individually and to carry out an initialization operation, so that there is a problem that it is not possible to make the VoIP terminal to be a communication terminal readily.

On the other hand, it is becoming possible to mount a high-resolution CCD or CMOS camera, a stereo speaker and a microphone in a mobile phone, but there is a problem that a communication network used in the mobile phone is a little bit inferior in data transmission speed as compared with the internet. In order to transmit and receive a moving picture of high picture quality and a sound of high sound quality in real time bidirectionally, being connected to the internet by wired becomes sometimes more advantageous.

Consequently, realization of a mobile phone having high convenience in which the communication system can be made to be a VoIP terminal readily by connecting a mobile phone which becomes popular as a familiar communication apparatus to a personal computer or the like and by utilizing the mobile phone as a sound input and output unit (microphone and speaker), a moving picture and a still picture input unit (imaging camera) of the communication system is to be desired.

However, as shown in Patent Document 1, it is necessary for a user in the past VoIP system to register unique information of the user such as SIP URI or UID, IP address or the like to the management server beforehand, wherein there is a problem that it becomes troublesome in this registration procedure. Further, the internet is a communication network which the general public utilizes, so that there is a problem of a masquerader at high risk in the registration procedure.

In order to solve this problem, there can be contemplated a method in which the communication system registers unique information of a user automatically to the management server, but it is necessary for this purpose to specify a user himself automatically, also securely and safely with high reliability by using encryption technology. In addition, it is desired, in realization of an encrypted communication system when the communication system registers unique information of a user to the management server automatically, to employ a system realizing the idea without adding excessive change to the existing VoIP management server and relay server which are under operation.

Also, the VoIP is a phone call network (telephone network) using the internet and degree of risk in wiretapping is high as compared with that of a phone call network in which a specified telecommunications carrier, for example, an ISP (Internet Services Provider) carries out the management strictly. A tool which carries out analysis by capturing a packet flowing through the internet network can be mounted even according to a financial power of an individual level. Consequently, there is a demand for encryption of a call control message for connecting phone call between a certain communication terminal and another communication terminal and a sound and moving picture stream.

The present invention was invented in view of the aforesaid aspects and is first directed to improve convenience such that a user can utilize it readily in which initialization operation is almost unnecessary when connecting a mobile apparatus utilizable as a sound input and output unit (microphone and speaker) and/or a moving picture and still picture input unit (imaging camera) of the communication system to the communication terminal.

Also, the present invention is secondly directed to prevent a masquerader in a procedure for registering user information to the management server when utilizing a telephone service by a telecommunication line.

Also, the present invention is thirdly directed to make wiretapping difficult on an occasion of a phone call (data transmission and reception) utilizing a telephone service by a telecommunication line.

In order to solve the aforesaid problem, the present invention connects a mobile phone to a telephone network using a telecommunication line by way of a communication terminal. The present invention makes a computer to realize a function of detecting that the mobile phone and the communication terminal are connected mutually when utilizing a telephone service which this telephone network provides, and a function of transferring user information of the mobile phone and a phone call program for utilizing the aforesaid telephone service stored in the mobile phone to the communication terminal through a transmission medium respectively in a case when it is detected that the mobile phone and the communication terminal are connected mutually. The present invention also makes a computer to realize a function of changing over sound data output destination of the sound input unit and sound data input source of the sound output unit of the mobile phone from a communication unit transmitting and receiving data by wireless to a transmission interface unit connecting to the communication terminal through a transmission medium and transmitting and receiving data respectively.

According to such a constitution, a program code executed in a control unit in the communication terminal is transferred from a memory unit of the mobile phone and is executed, so that labor hours which are necessary for initialization of an exclusive software for utilizing a telephone service using a telecommunication line can be drastically reduced.

Also, the mobile phone includes a sound input unit, a sound output unit, user information, a phone call program and constitutional information thereof in a lump, it is strong against wiretapping and user masquerade and also it can be constituted readily only by connecting a secure and safe phone call terminal having high sound quality and high picture quality to the communication apparatus.

In the above-mentioned invention, the communication terminal connected with the mobile phone has a feature in which user registration of a telephone service is carried out by using user information received from the mobile phone with respect to the telephone service management server carrying out telephone service management connected to the telephone network.

According to such a constitution, user information received from the mobile phone is used in a procedure for registering user information when utilizing the telephone service to the telephone service management server, so that it is possible to prevent masquerade.

Further, in the above-mentioned invention, the mobile phone has a feature in which a call control message is transmitted to the communication terminal by encryption utilizing user information stored in the mobile phone when carrying out data transmission and reception with respect to another communication terminal connected to the telephone network through the communication terminal and data encryption keys transmitted and received with respect to another communication terminal through the communication terminal are exchanged mutually.

According to such a constitution, every call control message is encrypted by utilizing user information stored in the mobile phone so as to be transmitted to the communication terminal and data encryption keys transmitted and received with respect to another communication terminal through the communication terminal are exchanged mutually, so that wiretapping on an occasion of a phone call can be prevented.

DESCRIPTION OF THE PREFERRED EMBODIMENTS

Hereinafter, it will be explained with respect to one exemplified embodiment of the present invention with reference to attached drawings.

Figure 1:
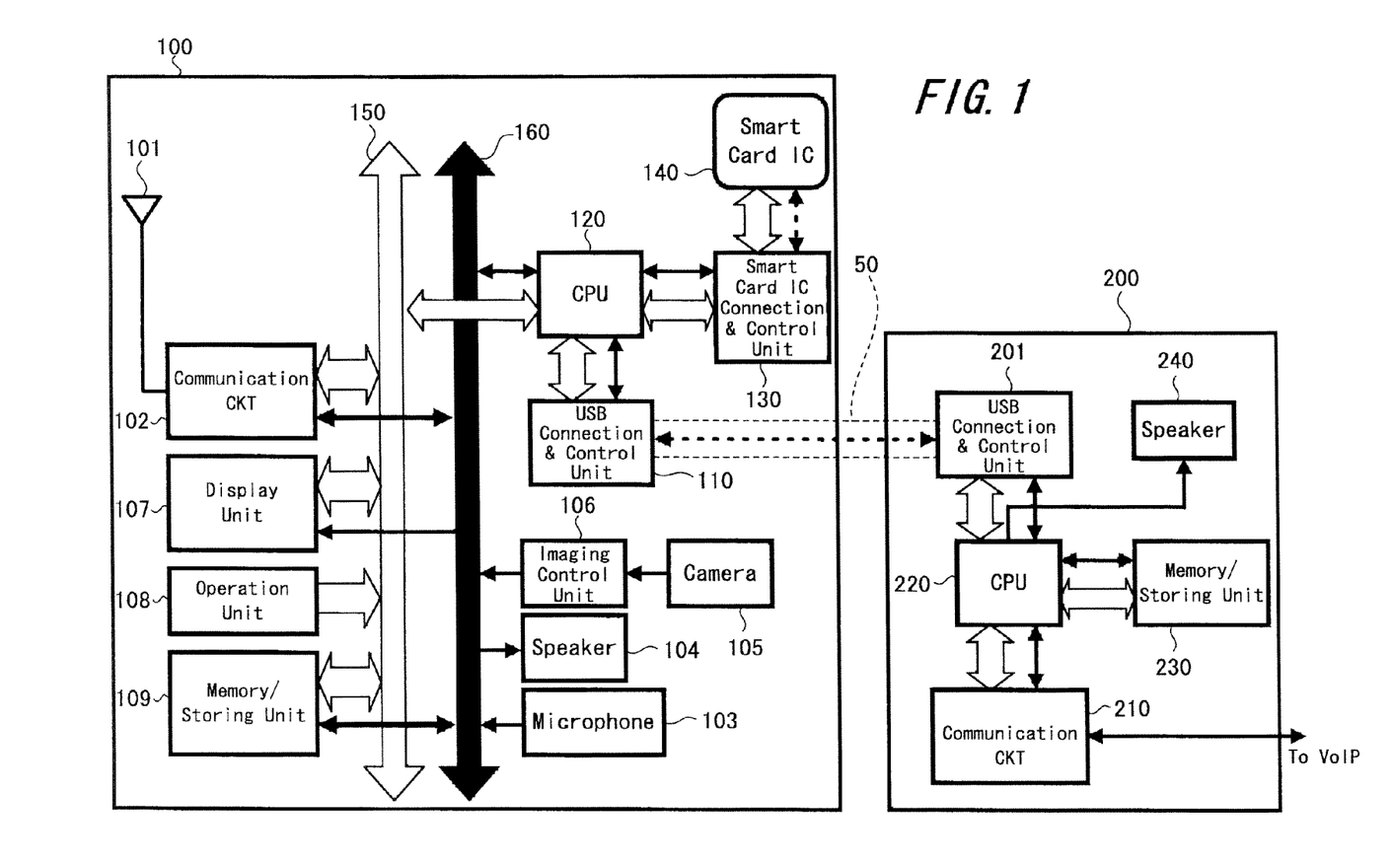
FIG. 1 is a diagram showing a block constitution example of a mobile phone and a communication terminal relating to one exemplified embodiment of the present invention.

FIG. 1 a diagram showing a block constitution example of a mobile phone and a communication terminal relating to one exemplified embodiment of the present invention. A mobile phone 100 is connected to a communication terminal 200 such as a personal computer or the like and it is constituted such that the mobile phone 100 is made to be utilizable as a sound input and output unit (microphone and speaker) and a moving picture and still picture input unit (camera) of the communication system.

The mobile phone 100 includes an antenna 101, a communication circuit (communication unit) 102, a microphone (sound input unit) 103, a speaker (sound output unit) 104, a camera 105, an imaging control unit 106 (imaging unit), a display unit 107, an operation unit 108, a memory/storing unit (memory unit) 109, a USB connection and control unit (transmission interface) 110, a CPU (control unit) 120, a Smart Card IC connection and control unit 130, a Smart Card IC (user information memory unit) 140, a control line 150, and a data line 160.

The antenna 101 carries out wireless data transmission and reception with respect to a base station (not shown) of the mobile phone network and the communication circuit 102 which is a phone call unit performs a predetermined signal process with respect to data transmitted and received through the antenna 101.

A sounds which is sound-picked up by the microphone 103 is inputted to the communication circuit 102 through the data line 160 and is transmitted to the base station by the antenna 101.

Sound data received by the antenna 101 pass from the communication circuit 102 to the data line 160, are inputted to the speaker 104 and are sound-emitted to the outside.

The camera 105 is composed of an optical system and an imaging device, and still picture data (or moving picture data) of a subject imaged by this camera 105 are supplied to the imaging control unit 106 and inputted to the display unit 107 after passing from the imaging control unit 106 to the data line 160.

The display unit 107 is composed, for example, of a liquid crystal display device or the like and displays still picture data (or moving picture data) imaged by the camera 105. Alternatively, it displays pictures stored in the memory/storing unit 109 or pictures received by the antenna 101.

The operation unit 108 is constituted by a jog dial, a push button and the like which are not shown, and various operation inputs by a user such as a calling operation, creating a message body of a mail and the like are carried out therein.

The memory/storing unit 109 stores programs which the CPU 120 must control and process. For example, a phone call program for utilizing a telephone service which uses a telecommunication line of internet or the like is stored therein after connecting the mobile phone 100 to the communication terminal 200. As a telephone service utilizing the internet, there exists, as one example, a VoIP (Voice over Internet Protocol) system which transmits and receives sound data by using a TCP/IP network, but it is not limited by this example.

The above-described phone call program includes a function of adjusting transfer block size, transfer order of blocks and data transfer rate of the data transmitted and received among the speaker 104, the microphone 103, the camera 105, the imaging control unit 106, the memory/storing unit 109 and the CPU 120 which are on the data line 160 in response to values showing transfer efficiency between USB connections and CPU processing speed on the side of the communication terminal 200.

It should be noted that the memory/storing unit 109 was made to have an integral structure of a memory function saving data temporarily when the CPU 120 carries out a predetermined process and a non-volatile storing function storing programs, but it may be made to have a different body structure.

The USB connection and control unit 110 includes a detection function of detecting that a USB cable 50 is connected and at the same time controls data transmission and reception which are carried out by using the USB cable 50 between the CPU 120 and the communication terminal 200.

The USB cable 50 is a communication cable for connecting the mobile phone 100 and the communication terminal 200 and in this embodiment, a USB cable which is used in a USB (Universal Serial Bus) interface is used.

The CPU 120 functions as a control unit for conducting a control of the whole mobile phone 100 and carries out a predetermined control and arithmetic process along the program stored in the memory/storing unit 109.

The Smart Card IC 140 saves user information and is constituted by built-in or detachably with respect to the mobile phone 100. The user information is unique information for every Smart Card IC and it is possible to specify with respect to a user of the internet phone service who uses the USB cable 50 by the user information stored in each Smart Card IC. The user information of the Smart Card IC 140 communicates with the CPU 150 through the Smart Card IC connection and control unit 130. As a detachable Smart Card IC, as one example, a SIM (Subscriber Identity Module), a UIM (User Identity Module) or the like is applicable.

The communication terminal 200 connected with the mobile phone 100 by the USB cable 50 is constituted by a USB connection and control unit (transmission interface) 201, a communication circuit (communication unit) 210, a CPU (control unit) 220, a memory/storing unit (memory unit) 230 and a speaker 240.

The USB connection and control unit 201 includes a detection function of detecting that the USB cable 50 is connected and at the same time controls data transmission and reception which are carried out by using the USB cable 50 between the CPU 220 and the mobile phone 100.

The communication circuit 210 is connected to a telecommunication circuit of internet or the like and is to carry out data transmission and reception. For example, when utilizing an internet phone service which the telecommunications carrier provides, it is connected to a management server which is connected to the internet and data are transmitted and received with respect to this management server and a user registration procedure is carried out.

The CPU 220 functions as a control unit for conducting a control of the whole mobile phone 200 and carries out a predetermined control and arithmetic process along the program stored in the memory/storing unit 230.

The memory/storing unit 230 stores programs which the CPU 220 must control and process. For example, in this embodiment, a phone call program for utilizing an internet phone service which is transmitted from the mobile phone 100, user information stored in the Smart Card IC 140 of the mobile phone 100 and the like are stored when the mobile phone 100 is connected to the communication terminal 200.

It will be described with respect to an operation in case of connecting the USB connection and control unit 110 of the mobile phone 100 and the USB connection and control unit 201 of the communication terminal 200 by means of the USB cable 50. When these connections are completed, the CPU 120 of the mobile phone 100 detects the USB connection after receiving an inquiry message from the USB connection and control unit 201 of the communication terminal 200. Then, the mobile phone terminal 100 returns a response message including function identifier of the speaker 104, the microphone 103, the camera 105 and the memory/storing unit 109 with respect to the USB connection and control unit 201 through the USB connection and control unit 110 and also the CPU 220 of the communication terminal 200 detects the USB connection.

The control software for controlling the CPU 120 of the mobile phone 100 transmits a control message to the speaker 104, the microphone 103, the camera 105, the imaging control unit 106, the memory/storing unit 109 through the control line 150 respectively when the USB connection with the communication terminal 200 is detected.

Then, data inputting source on the data line 160 of the speaker 104 is changed over from the communication circuit 102 to the CPU 120 and also, data output destination on the data line 160 of the microphone 103 is changed over from the communication circuit 102 to the CPU 120 and further, data output destination of the camera 105 and the imaging control unit 106 is changed over from the communication circuit 102 to the CPU 120.

The control software for controlling the CPU 120 of the mobile phone 100 transmits a control message to the speaker 104, the microphone 103, the camera 105, the memory/storing unit 109 and the imaging control unit 106 through the control line 150 in response to values showing transfer efficiency of the USB connection and control unit 110 and the USB connection and control unit 201 and processing speed of the CPU 220 which is notified from the CPU 220 to the CPU 120.

Then, adjustment of transfer block size, transfer order of blocks and data transfer rate of the data transmitted and received among the speaker 104, the microphone 103, the camera 105, the imaging control unit 106, the memory/storing unit 109 and the CPU 120 which are on the data line 160 is carried out. The imaging control unit 106 carrying out adjustment of amount of data on the data line 160 which are outputted from the camera 105 in response to the control message from the CPU 120.

It should be noted in this embodiment that a USB cable which is used in the USB interface is used for a communication cable, but it is allowed to use a communication cable for another communication interface (RS-232C, IEEE1394 or the like).

Here, it will be explained with respect to software of a highly convenient phone call (phone call program) in which initialization operation is almost unnecessary.

Figure 2:
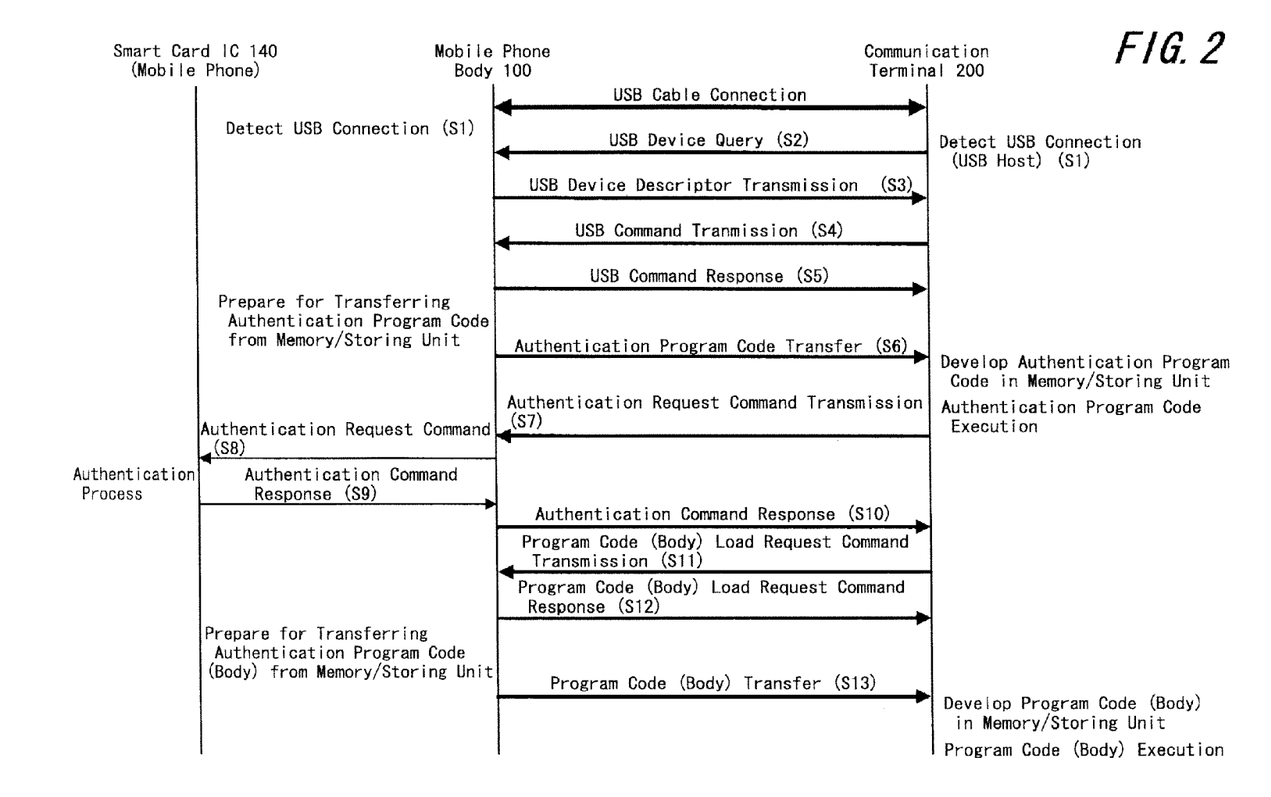
FIG. 2 is a diagram showing a load processing sequence of a program code relating to one exemplified embodiment of the present invention.

FIG. 2 is a sequence diagram showing a loading (reading out) process of a program code for utilizing an internet phone service stored in the mobile phone 100 by connecting the mobile phone 100 and the communication terminal 200 in the communication system shown in FIG. 1. A USB cable 500 between the Smart Card IC 140 and the communication terminal 200 and also the USB connection and control unit 110 of the mobile phone body 100, the CPU 120, the Smart Card IC connection and control unit 130 are omitted therein.

First, a user connects, as shown in FIG. 1, the USB connection and control unit 110 of the mobile phone 100 and the USB connection and control unit 201 of the communication terminal 200 by using the USB cable 50. According to this connection, it is detected that the USB connection and control unit 110 of the mobile phone 100 and the USB connection and control unit 201 of the communication terminal 200 are connected to the USB cable 50 respectively (S1), and it is notified to the CPU 120 and the CPU 220 respective.

The communication terminal 200 of the USB host side transmits USB device query to the mobile phone 100 (S2). In the mobile phone 100, the CPU 120 receives the USB device query and transmits USB device descriptor to the communication terminal 200 (S3). At that time, the CPU 120 of the mobile phone 100 sends back a response message including function identifier of the speaker 104, the microphone 103, the camera 105 and the memory/storing unit 109 with respect to the USB connection and control unit 201 through the USB connection and control unit 110.

The communication terminal 200 receives the USB device descriptor from the mobile phone 100 transmits USB command by bulk transfer (S4). At that time, basic software of the CPU 220 of the communication terminal 200 responds to function identifier of the memory/storing unit 109 and transmits control message of request for reading out a program code on the memory/storing unit 109 to the CPU 120 through the USB connection and control unit 201, the USB cable 50 and the USB connection and control unit 110.

The mobile phone 100 transmits a response with respect to the USB by command bulk transfer to the communication terminal 200 (S5). The communication telephone 100 carries out a preparation for transferring an authentication program code from the memory/storing unit 109 after responding to the USB command and transmits the authentication program code by bulk transfer to the communication terminal 200 (S6).

In the communication terminal 200, the authentication program code transferred from the mobile phone 100 is developed in the memory/storing unit 230 and the authentication program code is executed. Then, an authentication request command is transmitted by bulk transfer with respect to the mobile phone 100 (S7).

In the mobile phone 100, the control unit 120 transmits the authentication request command transmitted from the communication terminal 200 to the Smart Card IC 140 through the Smart Card IC connection and control unit 130 (S8). The Smart Card IC carries out an authentication process and sends back an authentication command response to the CPU 120 (S9).

It will be explained further specifically with respect to the aforesaid authentication process. The aforesaid authentication program code is executed on the CPU 220 and a random number producing request message (authentication request command) is transmitted to the Smart Card IC 140 through the USB connection and control unit 201, the USB cable 50, the USB connection and control unit 110, the CPU 120 and the Smart Card IC connection and control unit 130. The Smart Card IC 140 produces a random number and returns it to the authentication program code through the Smart Card IC connection and control unit 130, the CPU 120, the USB connection and control unit 110, the USB cable 50 and the USB connection and control unit 201.

The authentication program code and the Smart Card IC 140 have a same algorithm X and an initial authentication code P. The authentication program code transmits a result Z calculated by using the algorithm X with respect to the aforesaid random number and the initial authentication code P to the Smart Card IC 140 similarly through the USB connection and control unit 201, the USB cable 50, the USB connection and control unit 110, the CPU 120 and the Smart Card IC connection and control unit 130. Then, aforesaid random number and the result Z in which the initial authentication code P was calculated by using the algorithm X are compared in the Smart Card IC 140 and when they coincide with each other, the aforesaid authentication program recognizes the communication circuit 210 and the speaker 240. Also, it becomes a state in which the control software on the CPU 120 permits a request message of data writing-in from the CPU 220 to the memory/storing unit 109. Then, it operates as VoIP exclusive software.

For the initial authentication code P, it is used a value included in the aforesaid authentication program code or a value inputted from an operation unit attached to the communication terminal 200.

The CPU 120 transmits the authentication command response from the Smart Card IC 140 to the communication terminal 200 by bulk transfer (S10).

The CPU 220 of the communication terminal 200 receives the authentication command response from the mobile phone 100 and transmits a program code (body) loading request command with respect to the mobile phone 100 (S11).

The CPU 120 of the mobile phone 100 transmits a response with respect to the program code (body) loading request command from the communication terminal 200 to the communication terminal 200 by bulk transfer (S12).

Here, in the mobile phone 100, a preparation for transferring a program code (body) from the memory/storing unit 109 is carried out after the program code (body) loading request command response. The control software of the CPU 120 reads out program code (body) data on the memory/storing unit 109 through the control line 150 and the data line 160 and transmits the program code (body) to the communication terminal 200 by bulk transfer by way of the USB connection and control unit 110 and the USB cable 50 (S13).

In the communication terminal 200 which received the program code (body) from the mobile phone 100, the basic software of the CPU 220 develops the received program code (body) in the memory/storing unit 230 and executes the program code (body) on the CPU 220.

Next, it will be described with respect to a technique preventing a user masquerader in a sound phone call and a video phone.

Figure 3:
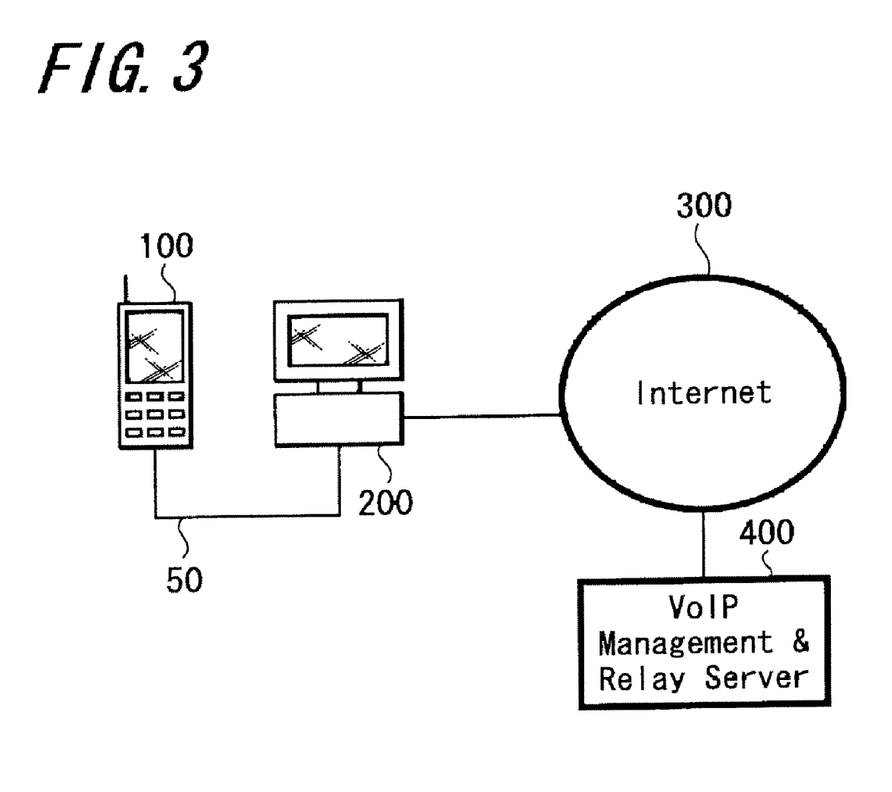
FIG. 3 is a diagram showing a system constitutional example (No. 1 thereof) relating to one exemplified embodiment of the present invention.

FIG. 3 is a diagram showing outline of a VoIP system which is a kind of a telephone service using internet. As shown in FIG. 3, the communication terminal 200 connected with the mobile phone 100 through the USB cable 50 is connectable to internet 300. The internet 300 is connected with a VoIP management and relay server 400 which realizes the VoIP system and the mobile phone 100 can utilize the VoIP system by connecting the communication terminal 200 to the VoIP management and relay server 400 by way of the internet 300.

The VoIP management and relay server 400 stores the user IP address and the MAC address of IP network interface in relationship to aforesaid user IP telephone number and SIR URI or UID (user information). In a case when a user utilizes the VoIP system, he registers his own UID, IP address, MAC address and IP telephone number to this VoIP management and relay server 400 beforehand.

Also, the VoIP management and relay server 400 has a relay function, obtains an IP address of an internet phone terminal (of a partner station) on the incoming side by notifying information such as IP telephone number, SIP URI or UID or the like of the phone call partner. Then, A packet communication is carried out with respect to the partner station through the IP network by using this IP address and sound and/or moving picture (still picture) information is transmitted.

It should be noted with respect to the aforesaid VoIP management and relay server 400 that the management function and the relay function are equipped in one server, but it my be allowed to allot them to separate servers. In this case, for example, the IP telephone number on the incoming side is notified to the management server so as to obtain the IP address and the MAC address of the incoming side on an occasion of an internet phone connection request from the outgoing side.

Figure 4:
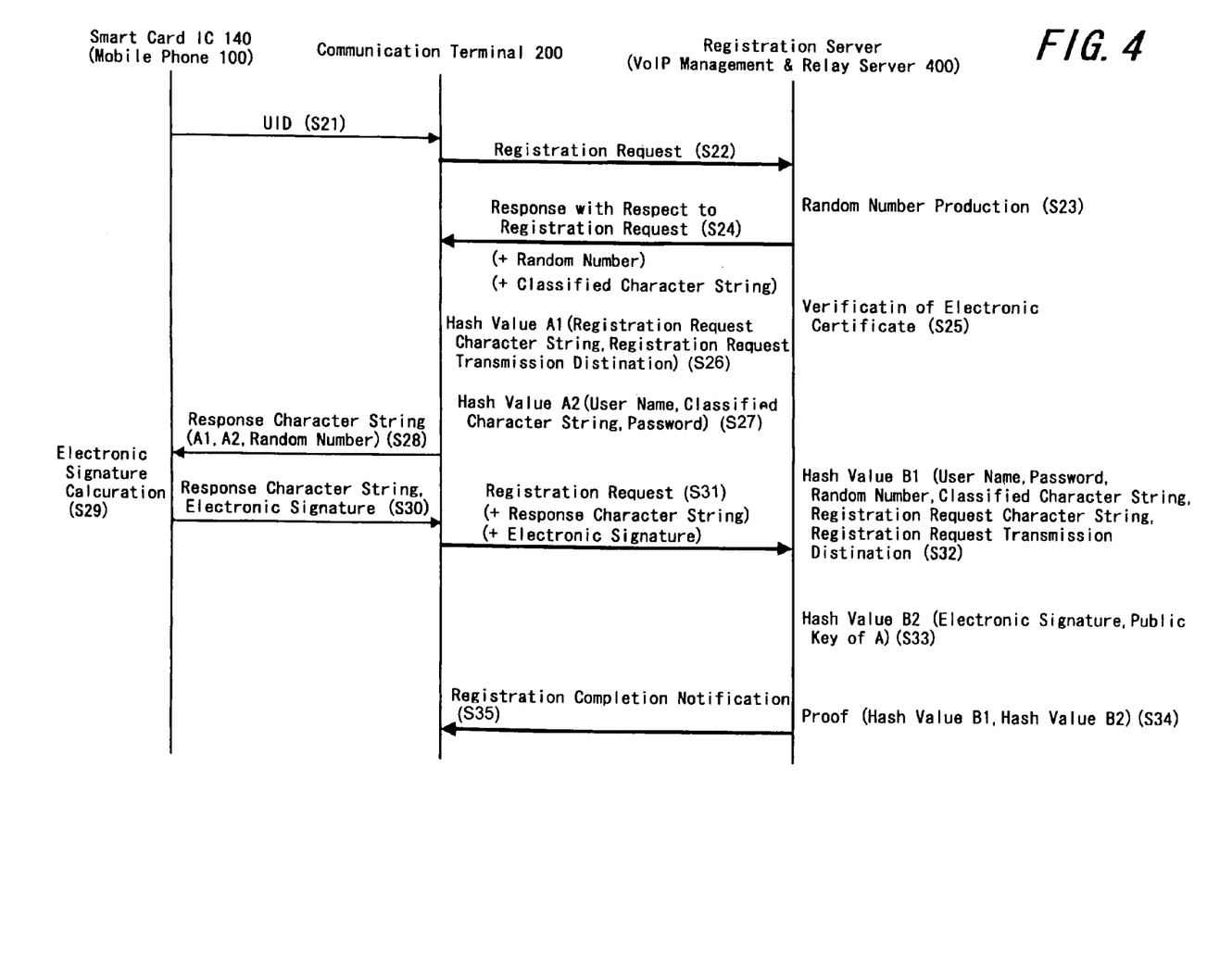
FIG. 4 is a diagram showing a registration processing sequence (No. 1 thereof) relating to one exemplified embodiment of the present invention.

FIG. 4 is a sequence diagram showing a registration process to the registration server (VoIP management and relay server 400) in an occasion when utilizing the VoIP system. In FIG. 4, there are omitted the USB cable 50 between the Smart Card IC 140 and the communication terminal 200, the USB connection and control unit 110, the CPU 120 and the Smart Card IC connection and control unit 130 in FIG. 1.

First, when an internet phone connection request of a user is inputted to the CPU 120 in a state that the mobile phone 100 and the communication terminal 200 are connected, UID (user information) is transmitted from the Smart Card IC 140 of the mobile phone 100 to the communication terminal 200 (S21). When receiving this, the communication terminal 200 transmits a user registration and authentication message with respect to the VoIP management and relay server 400 on the internet 300 (S22).

On the other hand, the VoIP management and relay server 400 produces a random number (S23) and sends back aforesaid random number together with a message designating that authentication by the Smart Card IC 140 is necessary to the communication terminal 200 (S24).

After making a response with respect to the registration request, the VoIP management and relay server 400 verifies electronic certificate of the communication terminal 200 by using a public key of an authentication office (S25).

The communication terminal 200 calculates a hash value A1 from registration request character string and registration request transmission destination by using a hash algorithm H (S26). Also, a hash value A2 is calculated from SIP URI or UID (user name), classified character string (discriminating information specifying classified VoIP service) and password (authentication code) by using the hash algorithm H (S27).

The communication terminal 200 transfers respective hash values (response character strings) calculated in the processes of S26 and S27 and a random number to the Smart Card IC 140 of the mobile phone 100 (S28), and calculates an electronic signature (signature) by using an asymmetric key cryptogram algorithm such as elliptic curve cryptogram or RSA cryptogram in the Smart Card IC 140 or the like and a secret key of the communication terminal 200 (S29).

The Smart Card IC 140 transmits the aforesaid electronic signature and response character string to the CPU 120 of the communication terminal body 200 (S30).

The CPU 120 of the communication terminal 200 receives the electronic signature and the response character string from the Smart Card IC 140 and transmits a user registration message (response character string and electronic signature) with respect to the VoIP management and relay server 400 (S31). The SIP URI or UID of the communication terminal 200 and the authentication code (password) are saved in the VoIP management and relay server 400 beforehand.

The VoIP management and relay server 400 calculates a hash value B1 from SIP URI or UID, authentication code (password) and discriminating information specifying the classified VoIP service in the communication terminal 200 and the random number which the VoIP management and relay server 400 produced in the process of S23 by using the hash algorithm H (S32). Also, by using the public key of the communication terminal 200 which is described in the electronic certificate of the communication terminal 200 in S25, the electronic signature transmitted from the communication terminal 200 is decrypted and a hash value B2 is obtained (S33).

Then, the VoIP management and relay server 400 compares the hash value B1 obtained in the process of S32 and the hash value B2 obtained in the process of S33 (S34) and, if they are identical, notifies a message permitting a personal registration (registration completion notification) to the communication terminal 200 (S35).

Next, it will be explained with respect to a technique for expanding the VoIP relay and management server in order to prevent masquerade of a user in the sound phone call and the video phone. There are very few ordinary VoIP management and relay servers having a high function which can correspond to the electronic signature or the like. Consequently, it is constituted in this embodiment such that a gateway function is added to an existing VoIP management and relay server.

Figure 5:
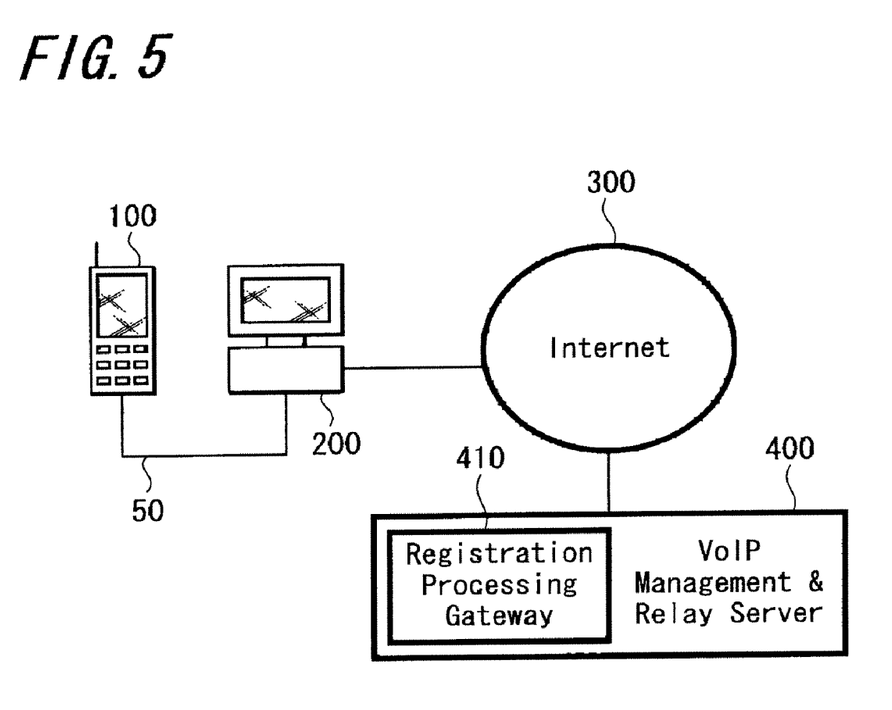
FIG. 5 is a diagram showing a system constitutional example (No. 2 thereof) relating to one exemplified embodiment of the present invention.

FIG. 5 is an example in which a gateway program (registration processing gateway 410) is arranged in the same chassis of the VoIP management and relay server 400 with respect to the system constitution of FIG. 3. It is assumed that the gateway program does not exert an influence on the existing VoIP management and relay server 400. It should be noted that this gateway program is equally safe only if it is housed in the server within the computer network in which safety is secured even though it is not arranged in the same chassis.

Figure 6:
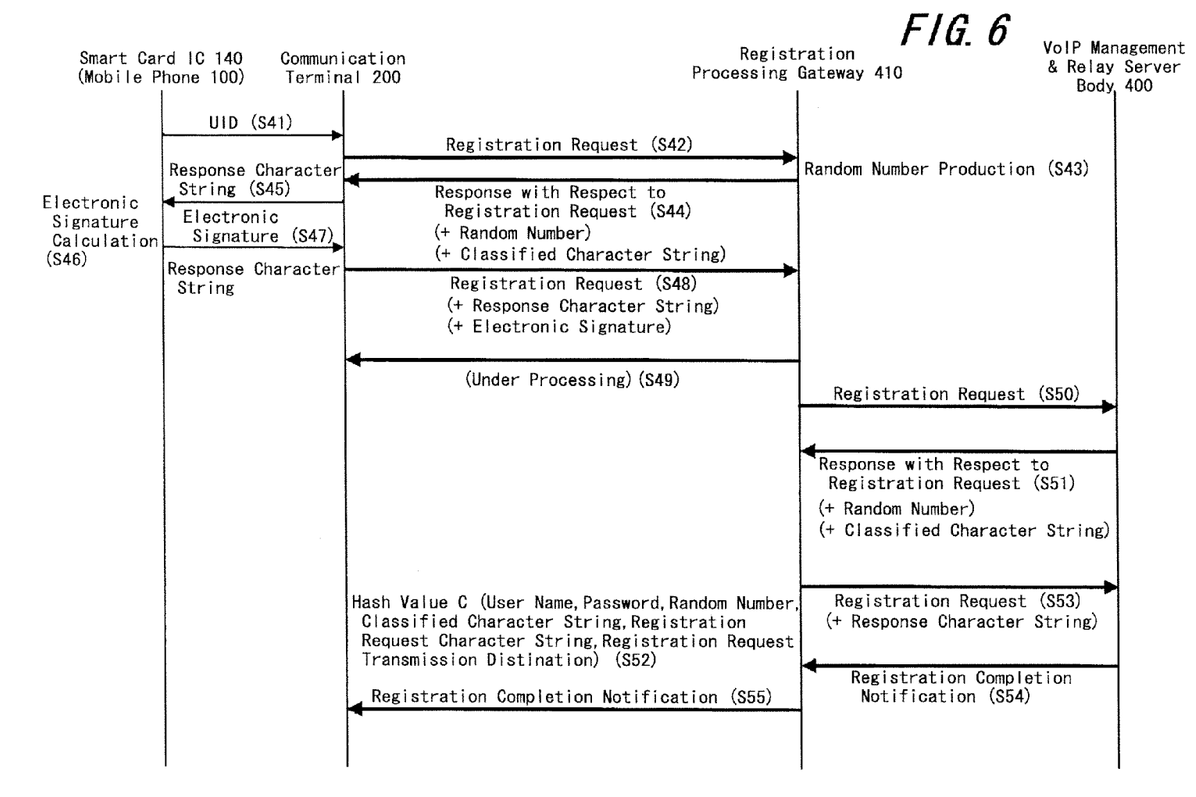
FIG. 6 is a diagram showing a registration processing sequence (No. 2 thereof) relating to one exemplified embodiment of the present invention.

FIG. 6 is a sequence diagram showing a registration process to a registration server (VoIP management and relay server 400) provided with the registration processing gateway 410 on an occasion of the VoIP system utilization. Processes of S41 to S48 in FIG. 6 correspond to the processes of S21 to S24 and S26 to S31 shown in FIG. 4.

More specifically, when an internet phone connection request of a user is inputted to the CPU 120 in a state that the mobile phone 100 and the communication terminal 200 are connected, UID (user information) is transmitted from the Smart Card IC 140 of the mobile phone 100 to the communication terminal 200 (S41). Accepting this, the communication terminal 200 transmits a user registration and authentication message with respect to the registration processing gateway 410 of the VoIP management and relay server 400 on the internet 300 (S42).

On the other hand, the registration processing gateway 410 of the VoIP management and relay server 400 produces a random number (S43) and sends back the aforesaid random number to the communication terminal 200 together with a message which designates that authentication by the Smart Card IC 140 is necessary (S44).

The communication terminal 200, similarly as FIG. 4, calculates a hash value from a registration request character string and a registration request transmission destination by using the hash algorithm H. Also, a hash value is calculated from SIP URI or UID (user name), a classified character string (discriminating information specifying classified VoIP service), password (authentication code) by using the hash algorithm H.

The communication terminal 200 transfers respective hash values (response character strings) calculated and a random number to the Smart Card IC 140 of the mobile phone 100 (S45), and calculates an electronic signature (signature) by using an asymmetric key cryptogram algorithm such as elliptic curve cryptogram or RSA cryptogram in the Smart Card IC 140 or the like and a secret key of the communication terminal 200 (S46).

The Smart Card IC 140 transmits the aforesaid electronic signature and response character string to the CPU 120 of the communication terminal body 200 (S47).

The CPU 120 of the communication terminal 200 receives the electronic signature and the response character string from the Smart Card IC 140 and transmits a user registration message (response character string and electronic signature) with respect to the registration processing gateway 410 of the VoIP management and relay server 400 (S48).

The registration processing gateway 410 receives the user registration message and authentication processes corresponding to S32 to S34 shown in FIG. 4 are carried out in the registration processing gateway 410. When this authentication process is completed, the registration processing gateway 410 transmits a user registration and authentication message to the existing VoIP management and relay server 400 having an authentication structure without using the Smart Card IC 140 or PKI (Public Key Infrastructure) and executes a user registration and authentication process which is unique for the existing VoIP management and relay server. When the registration and authentication process is completed, the registration processing gateway 410 transmits a user registration and authentication completed message which corresponds to the process of S35 in FIG. 4 with respect to the communication terminal 200. It should be noted in a user registration and authentication process that a halfway message designating that the process is progressing is transmitted (S49).

More specifically, a user registration and authentication message (registration request) is transmitted from the registration processing gateway 410 with respect to the VoIP management and relay server body 400 (S50).

The VoIP management and relay server 400 produces a random number and sends back the aforesaid random number to the communication terminal 200 together with the classified character string (S51).

The communication terminal 200 calculates a hash value (response character string) from the user name, the password, the random number, the classified character number string, the registration request character string and the registration request transmission destination by using the hash algorithm H (S52). Then, the communication terminal 200 transmits a user registration message (response character string) to the VoIP management and relay server body 40 (S53).

The VoIP management and relay server 400 carries out an authentication and registration process by using a user registration message from the registration processing gateway 410 and when the authentication and registration process is completed, the VoIP management and relay server 400 notifies a message (registration completion notification) which permits a personal registration with respect to the registration processing gateway 410 (S54).

The registration processing gateway 410 transmits the registration completion notification from the VoIP management and relay server body 400 to the communication terminal 200 (S55).

Next, it will be explained with respect to a technique preventing data wiretapping in the sound phone call and the video phone.

Figure 7:
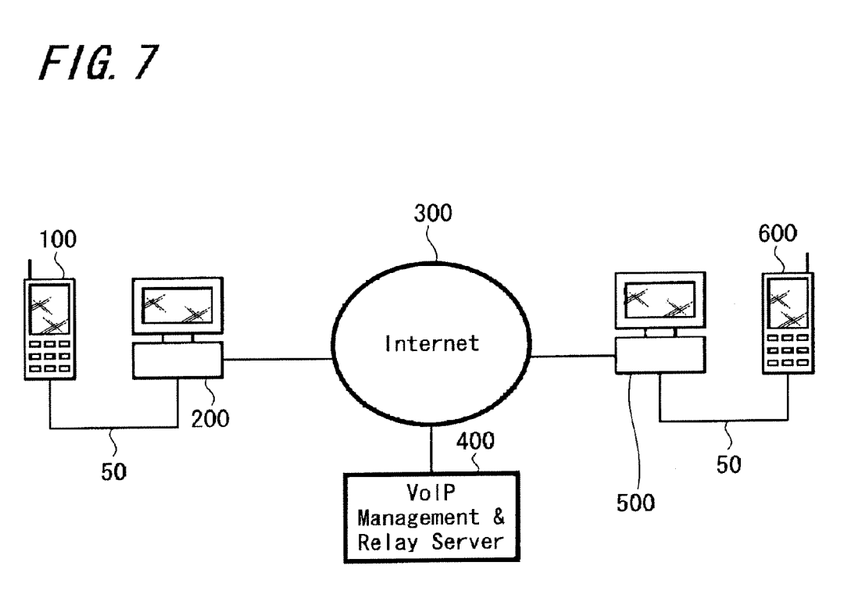
FIG. 7 is a diagram showing a system constitutional example (No. 3 thereof) relating to one exemplified embodiment of the present invention.

FIG. 7 shows an example having a constitution, with respect to the system constitution of FIG. 3, in which the communication terminal 500 is connected to the internet 300 and a mobile phone 600 is connected to this communication terminal 500 through the USB cable 50.

Figure 8:
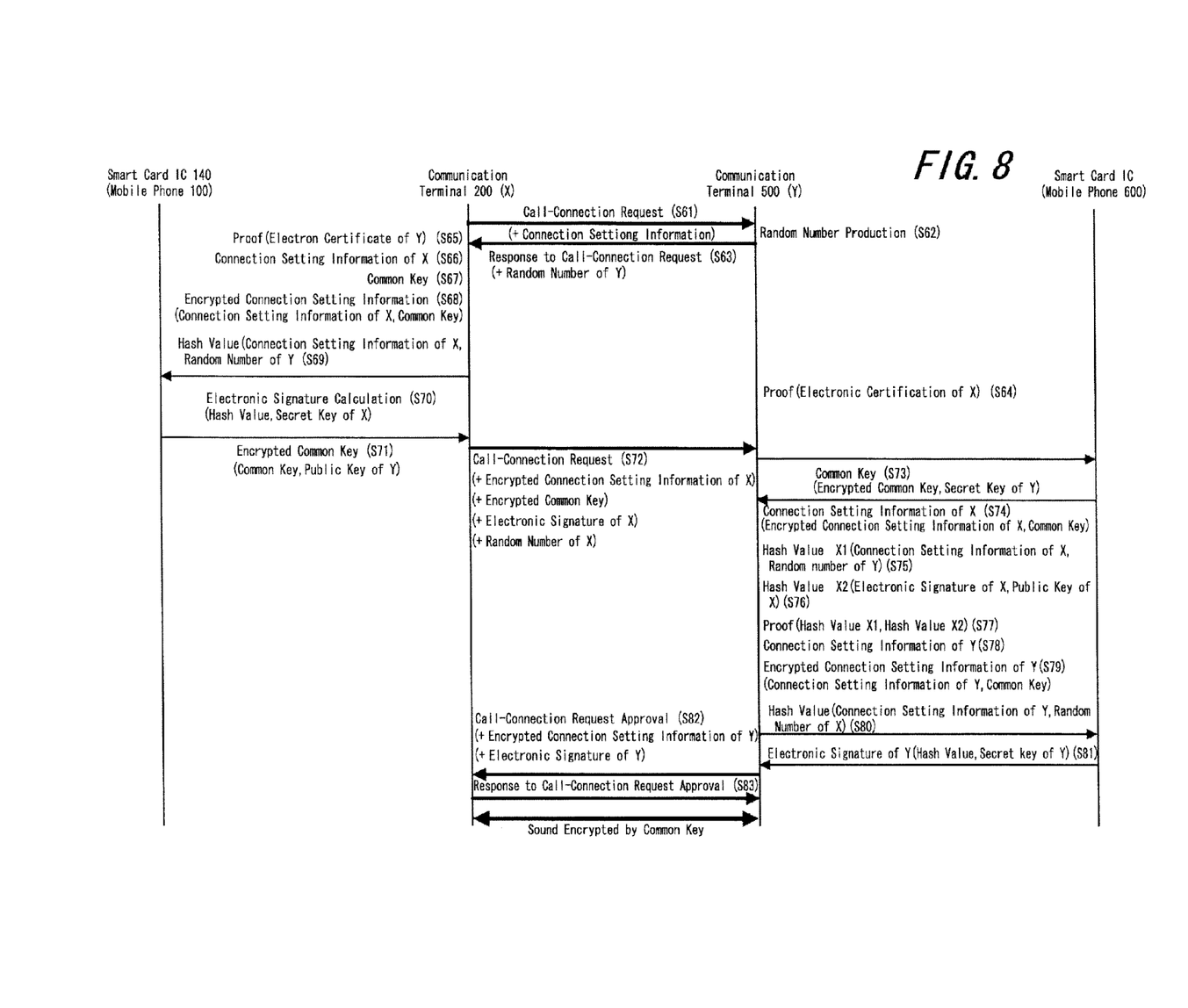
FIG. 8 is a diagram showing a phone call processing sequence relating to one exemplified embodiment of the present invention.

FIG. 8 is a sequence diagram showing a phone call process according to the mobile phone 100 and the mobile phone 600. In FIG. 8, there are omitted the USB cable 50 between the Smart Card IC 140 and the communication terminal 200, the USB connection and control unit 110, the CPU 120 and the Smart Card IC connection and control unit 130 in FIG. 1. Here, the registration process to the VoIP management and relay server 400 of the mobile phone 100 and 600 was completed. It should be noted as a matter of convenience of spaces in the drawing that the communication terminal 200 is expressed as X and the communication terminal 600 as Y.

First, the communication terminal 200 transmits a connection request message (call-connection request) with respect to the communication terminal 500 (S61). At that time, sound codec and moving picture codec which the communication terminal and the mobile phone can have correspondence with and a parameter thereof are transmitted.

The communication terminal 500 produces a random number (S62), and transmits a message requesting mutual authentication and exchange of the encryption key by the Smart Card IC 140 (response to call-connection request) and the above-mentioned random number to the communication terminal 200 (S63).

After the process of aforesaid S63 is ended, the communication terminal 500 verifies electronic certificate of the communication terminal 200 which is stored in the memory/storing unit 230 beforehand according to the mutual exchange by using a public key of an authentication office (S64).

On the other hand, the communication terminal 200 verifies electronic certificate of the communication terminal 500 which is stored in the memory/storing unit 109 beforehand according to the mutual exchange by using a public key of an authentication office (S65).

Also, the communication terminal 200 produces setting information (SPD) for mutual connection of the sound and moving picture stream describing sound codec and moving picture codec which the communication terminal 200 and the mobile phone 100 can have correspondence with and a parameter for connection (S66).

Also, in the communication terminal 200, a common key for encrypting the sound and moving picture stream is created based on the random number produced by itself (S67).

Also, setting information (SPD) for mutual connection of the sound and moving picture stream produced in the process of S66 is encrypted by using the common key produced in the process of S67 (S68).

Also, a hash value is calculated by using the setting information (SPD) for mutual connection of the sound and moving picture stream which was produced in the process of S66 and the random number received from the communication terminal 500 in the process of S64 in accordance with the hash algorithm H (S69).

The communication terminal 200 transfers the hash value calculated in the process of S69 to the Smart Card IC 140. The Smart Card IC 140 calculates the electronic signature (signature) by using asymmetric key cryptogram algorithm such as elliptic curve cryptogram, RSA cryptogram or the like and the secret key of the communication terminal 200 (S70).

After calculation of the electronic signature is ended, the communication terminal 200 encrypts the common key produced in the process of S67 by using the public key of the communication terminal 500 which was taken out after the verification in the process of S65 (S71).

The communication terminal 200 transmits a connection request response message corresponding to S63 to the communication terminal 500 (S72). Here, the communication terminal 200 produces a random number and transmits this random number, setting information (SPD) for mutual connection of the encrypted sound and moving picture stream calculated in the process of S68, the electronic signature (signature) calculated in the process of S70 and the encrypted common key calculated in the process of S71 to the communication terminal 500 together with the connection request response message of S72.

The communication terminal 500 transfers the encrypted common key received from the communication terminal 200 in the process of S72 to the Smart Card IC of the mobile phone 600, calculates by using an asymmetric key cryptogram algorithm such as an elliptic curve cryptogram or an RSA cryptogram in the Smart Card IC secret key of the communication terminal 500 and obtains the common key in S67 (S73).

The communication terminal 500 decrypts the setting information (SPD) for mutual connection of the encrypted sound and moving picture stream received from the communication terminal 200 in the process of S72 by using the common key obtained in the process of S73 and obtains setting information (SPD) for mutual connection of the sound and moving picture stream of the communication terminal 200 (S74).

Also, a hash value X1 is calculated according to the hash algorithm H by using the random number value of the communication terminal 500 which is attached to the message in the process of S63 and the setting information (SPD) for the mutual connection of the sound and moving picture stream of the communication terminal 200 which was obtained in the process of S74 (S75).

The electronic signature (signature) of the communication terminal 200 received in the process of S72 is decrypted by using the public key of the communication terminal 200 which was taken out after being verified in S64 and a hash value X2 is obtained (S76).

Then, the value obtained in the process of S75 and the value obtained in the process of S76 are compared and verified (S77). If they coincide, it can be concluded that the possibility of a masquerader or a malicious third party to the communication terminal 200 is boundlessly low.

Also, setting information (SPD) for mutual connection of a sound and moving picture stream which describes sound codec and moving picture codec with which the communication terminal 500 and the mobile phone 600 can have correspondence and a parameter for connection is produced (S78).

Also, the setting information (SPD) for mutual connection of the sound and moving picture stream which was produced in the process of S78 is encrypted by using the common key obtained in the process of S73 (S79).

Also, a hash value is calculated by using the setting information (SPD) for mutual connection of the sound and moving picture stream which was produced in the process of S78 and the random number received from the communication terminal 200 in the process of S72 in accordance with the hash algorithm H (S80).

The communication terminal 500 transfers the hash value calculated in the process of S80 to the Smart Card IC, and the electronic signature (signature) is calculated by using asymmetric key cryptogram algorithm such as elliptic curve cryptogram, RSA cryptogram or the like in the Smart Card IC and the secret key of B (S70).

The communication terminal 500 transmits a response message in response to S72 with respect to communication terminal 200 (S82). Here, the communication terminal 500 transmits setting information (SPD) for mutual connection of the encrypted sound and moving picture stream calculated in the process of S79 and the electronic signature (signature) calculated in the process of S81 to the communication terminal 200 together with the above-mentioned connection request response message.

The communication terminal 200 transmits a response message corresponding to S82 with respect to the communication terminal 500 (S83).

A connection of the sound and moving picture stream is constituted by using the setting information (SPD) for mutual connection of the sound and moving picture stream of the communication terminal 200 which was obtained through the process of S74 and data flowing in the sound and moving picture stream is encrypted and decrypted by using the common encryption key which are commonly used between the communication terminal 200 and the communication terminal 500 through the processes of S67 and S73. When the communication terminal 200 transmits data, encryption is carried out by using the above-mentioned common key and when the communication terminal 500 receives the encrypted data, decryption is carried out by using the above-mentioned common key. Similarly, when the communication terminal 500 transmits data, encryption is carried out by using the above-mentioned common key and when the communication terminal 200 receives the encrypted data, decryption is carried out by using the above-mentioned common key.

According to the exemplified embodiment mentioned above, the detector detecting that the mobile phone and the communication terminal are connected mutually and the control software in the mobile phone transmits a control message to the speaker, the microphone, the camera, the memory/storing unit and the imaging control unit through the control line. Also, there is included a function for changing over the data inputting source of the speaker, the data output destination of the microphone and camera and the data output destination of the imaging control unit from the communication circuit to the CPU and USB interface unit. Further, there is included a function of adjusting transfer block size, transfer order of blocks and data transfer rate of the data being exchanged among the speaker, the microphone, the camera, the memory/storing unit, the imaging control unit and the CPU of the mobile phone which are on the data line in response to values showing transfer efficiency between USB connections and CPU processing speed on the side of the communication terminal. And therefore, it is possible to be utilized as a sound input and output unit (microphone and speaker) and a moving picture and still picture input and output unit (camera) of a communication system and also, it is possible to keep quality of a moving picture, a still picture and a sound according to adjusting function of the data transfer rate and data block size which are dealt between the mobile phone and the communication terminal.

Thus, a user can utilize a mobile phone which became popular as a familiar communication apparatus readily as a sound input and output unit (microphone and speaker) and an imaging camera by connecting it to a communication terminal such as a personal computer and the like. And also, it is possible to constitute a VoIP system readily in which a moving picture of high picture quality and a sound of high sound quality are transmitted and received bidirectionally in real time by utilizing a communication circuit which the communication terminal includes and in which a broad band communication is possible.

Also, according to the above-mentioned exemplified embodiment, the mobile phone includes a microphone, a speaker, an imaging camera, a Smart Card IC, VoIP exclusive software and the constitutional information thereof in a lump, it is strong against wiretapping and user masquerade and also it can be constituted readily only by connecting a secure and safe VoIP terminal having high sound quality and high picture quality to the personal computer.

Also, the program code executed by the processor (CPU) in the communication terminal is transferred from the memory/storing unit of the mobile phone to be executes, so that it is possible to reduce labor hours for initialization of the exclusive VoIP software drastically and convenient utilization thereof is improved.

And also, the program code executed by the processor in the communication terminal is transferred from the memory/storing unit in the mobile phone is executed after going through the Smart Card IC and the authentication process in the mobile phone, so that there can be provided a VoIP terminal which is strong against modification and falsification of the program code and user masquerade and which can be utilized securely and also safely.

According to the above-mentioned exemplified embodiment, not only when a phone call partner also utilize a VoIP terminal system in which a same kind of mobile phone or Smart Card IC is diverted but also a phone call partner utilizes a VoIP terminal system which has weak point in usual wiretapping, it can have correspondence therewith and a high security effect is achieved not being limited by the phone call partner in a case when the phone call partner utilizes the same kind of mobile phone by connecting to a communication terminal. Consequently, it is possible to inhibit masquerader on an occasion of user registration to the VoIP management and relay server and at the same time it is possible to prevent wiretapping on an occasion of a phone call.

Also, according to the above-mentioned exemplified embodiment, the problem is solved by setting a gateway without requiring modification in the program code body of the existing VoIP management and relay server, so that it is possible to continue utilizing the existing VoIP management and relay server continuously without wasting the existing capital investment to the VoIP management and relay server. Consequently, it is possible to inhibit masquerader on an occasion of user registration to the VoIP management and relay server and at the same time it is possible to prevent wiretapping on an occasion of a phone call.

It should be noted in the above-mentioned exemplified embodiment that it was explained by taking a mobile phone as an example for one example of a mobile apparatus which includes a sound input and output unit (microphone, speaker), but the present invention can be applied similarly also to other apparatuses such as, for example, a game machine, a DPA and the like.

Also, it was constituted such that data transmission and reception in the data line of the mobile phone is controlled by observing transfer efficiency between the mobile phone and the communication terminal, but it may be constituted, for example, such that transfer efficiency between the communication terminal and the VoIP management and relay server is measured and the measured result thereof is transferred to the mobile phone so as to set communication rate of the data transmitted and received in the data line within the mobile phone.

Also, it is needless to say that the present invention is not limited by each of the exemplified embodiments mentioned above and various modifications and changes can be employed in different ways in the region without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile phone connected to a telephone network which uses a telecommunication line by way of a communication terminal comprising:

a communication unit configured to transmit and receive data by wireless;

a sound input unit and a sound output unit which are configured to input and output sound data respectively;

a transmission interface unit connected to said communication terminal through a transmission medium and configured to transmit and receive data;

a user information memory unit configured to store user information and constituted by being built-in or attached detachably;

a memory unit configured to store a phone call program for utilizing a telephone service which is provided by said telephone network, the phone call program being an application for the communication terminal for connecting the mobile phone to the telephone network through the communication terminal;

a detection unit configured to detect that an own apparatus and said communication terminal are connected mutually; and a control unit configured to transfer user information stored in said user information memory unit and the phone call program stored in said memory unit to said communication terminal through said transmission medium respectively and also configured to change over a sound data output destination of said sound input unit and a sound data input source of said sound output unit from said communication unit to said transmission interface unit respectively in a case when it is detected by said detection unit that the own apparatus and said communication terminal are connected mutually.

2. A mobile phone according to claim 1 further comprising:
an imaging unit, wherein said control unit is configured to change over output destination of image data imaged by said imaging unit from said communication unit to said transmission interface unit in a case when it is detected by said detection unit that the own apparatus and said communication terminal were connected mutually.

3. A mobile phone according to claim 1, wherein when said control unit transfers said user information stored in said user information memory unit to said communication terminal through said transmission medium, an authentication process between the own apparatus and said communication terminal is carried out based on said user information.

4. A mobile phone according to claim 1, wherein said control unit adjusts transfer block capacity, transfer order of a data block and a data transfer rate of data which are transmitted and received among said sound input unit, said sound output unit, said memory unit and said control unit in response to transfer efficiency of said transmission medium and processing speed of a control unit on said communication terminal side.

5. A mobile phone according to claim 1, wherein when said control unit carries out data transmission and reception with respect to another communication terminal which is connected to said telephone network through said communication terminal, said control unit transmits a call control message to said communication terminal by encryption utilizing user information stored in said user information memory unit and exchanges encryption keys of said data mutually which are transmitted and received with said another communication terminal through said communication terminal.

6. A communication terminal connected with a mobile phone and connected to a telephone network which uses a telecommunication line comprising:

a communication unit configured to transmit and receive data by said telecommunication line;

a transmission interface unit connected to said mobile phone through a transmission medium and configured to transmit and receive data;

a memory unit configured to save data transmitted from said mobile phone including a phone call program, the phone call program being an application for the communication terminal for connecting the mobile phone to the telephone network through the communication terminal;

a detection unit configured to detect that an own apparatus and said mobile phone are connected mutually; and a control unit configured to receive user information transmitted from said mobile phone and the phone call program for utilizing a telephone service which said telephone network provides respectively through said transmission medium and configured to store them in said memory unit in a case when it is detected by said detection unit that the own apparatus and said mobile phone are connected mutually.

7. A communication terminal according to claim 6, wherein said control unit carries out an authentication process of the own apparatus and said mobile phone based on user information received from said mobile phone and executes said phone call program which is received from said mobile phone and developed in said memory unit.

8. A communication terminal according to claim 6, wherein said control unit carries out a user registration of said telephone service with respect to a telephone service management server which is connected to said telephone network and carries out telephone service management by using user information received from said mobile phone.

9. A communication terminal according to claim 8, wherein said control unit carries out a user registration of said telephone service with respect to said telephone service management server through a registration processing gateway which is connected to said telephone network and carries out a registration process to said telephone service.

10. A communication terminal according to claim 6, wherein said control unit receives an encrypted call control message from said mobile phone by utilizing user information of said mobile phone and mutually exchanges encryption keys of said data which are transmitted and received with respect to another communication terminal when carrying out data transmission and reception with respect to said another communication terminal connected to said telephone network by a request from said mobile phone.

11. A phone call method which is used in a communication system including a communication unit transmitting and receiving data by wireless; a sound input unit and a sound output unit which are inputted and outputted with sound data respectively; a transmission interface unit which is connected to a communication terminal through a transmission medium and transmits and receives data; a user information memory unit storing user information and constituted by being built-in or detachably attached; a memory unit storing a phone call program for utilizing a telephone service which uses a telecommunication line; a detection unit detecting that an own apparatus and said communication terminal are connected mutually; a mobile phone having a control unit; a communication unit transmitting and receiving data by said telecommunication line; a transmission interface unit connected to said mobile phone through a transmission medium and transmitting and receiving data; a memory unit storing data transmitted from said mobile phone; a detection unit detecting that the own apparatus and said mobile phone are connected mutually; and a communication terminal having a control unit and connected to a telephone network using said telecommunication line, the phone call method comprising:

detecting whether or not said mobile phone and said communication terminal are connecting mutually by the detection unit of said mobile phone and the detection unit of said communication terminal;

transferring user information stored in the user information memory unit of said mobile phone and the phone call program stored in said memory unit to said communication terminal through said transmission medium respectively in a case when it is detected that said mobile phone and said communication terminal are connected mutually, the phone call program being an application for the communication terminal for connecting the mobile phone to the telephone network through the communication terminal;

storing the user information and the phone call program transmitted from said mobile phone in the memory unit of said communication terminal by said communication terminal; and changing over sound data output destination of said sound input unit and sound data input source of said sound output unit from said communication unit transmitting and receiving data by wireless to said transmission interface unit connected to said communication terminal respectively by the control unit of said mobile phone.

12. A non-transitory computer readable medium encoded with a phone call program for connecting a mobile phone to a telephone network which uses a telecommunication line by way of a communication terminal and utilizing a telephone service provided by said telephone network, and, when loaded on a processor, the program causes the processor to perform a method comprising:

detecting that said mobile phone and said communication terminal connected mutually;

transferring user information of said mobile phone and a phone call program for utilizing said telephone service stored in said mobile phone to said communication terminal through a transmission medium respectively in a case when it is detected that said mobile phone and said communication terminal are connected mutually, the phone call program being an application for the communication terminal for connecting the mobile phone to the telephone network through the communication terminal; and changing over sound data output destination of the sound input unit and sound data input source of the sound output unit of said mobile phone from a communication unit transmitting and receiving data by wireless to a transmission interface unit connecting to said communication terminal through a transmission medium and transmitting and receiving data respectively.

* * * * *